(12) United States Patent
Pickett et al.

(10) Patent No.: US 9,374,939 B2
(45) Date of Patent: Jun. 28, 2016

(54) SYSTEM AND METHOD FOR STEERING OF AN IMPLEMENT ON SLOPED GROUND

(71) Applicant: Deere & Company, Moline, IL (US)

(72) Inventors: Terence D. Pickett, Waukee, IA (US); Wade S. Mitchell, Buckingham, IA (US); Frederick W. Nelson, Waukee, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/473,049

(22) Filed: Aug. 29, 2014

(65) Prior Publication Data

US 2016/0057921 A1 Mar. 3, 2016

(51) Int. Cl.
*A01B 69/04* (2006.01)
*G05D 1/02* (2006.01)

(52) U.S. Cl.
CPC .............. *A01B 69/008* (2013.01); *G05D 1/021* (2013.01); *G05D 2201/0201* (2013.01)

(58) Field of Classification Search
CPC ............................... A01B 69/008; G05D 1/021
USPC .......................................................... 701/50
See application file for complete search history.

(56) References Cited

U.S. PATENT DOCUMENTS

| | | | |
|---|---|---|---|
| 4,433,533 A | 2/1984 | Giani | |
| 4,463,811 A | 8/1984 | Winter | |
| 5,838,562 A * | 11/1998 | Gudat | B60K 31/0008 180/167 |
| 6,434,462 B1 | 8/2002 | Bevly et al. | |
| 6,553,925 B1 | 4/2003 | Beaujot | |
| 6,688,403 B2 | 2/2004 | Bernhardt et al. | |
| 6,789,014 B1 * | 9/2004 | Rekow | G01C 21/165 180/9.38 |
| 6,804,587 B1 | 10/2004 | O'Connor et al. | |
| 6,865,465 B2 | 3/2005 | McClure | |
| 7,147,241 B2 | 12/2006 | Beaujot et al. | |
| 7,162,348 B2 | 1/2007 | McClure et al. | |
| 7,373,231 B2 | 5/2008 | McClure et al. | |
| 7,383,114 B1 | 6/2008 | Lange et al. | |
| 7,580,783 B2 | 8/2009 | Dix | |
| 7,689,354 B2 | 3/2010 | Heiniger et al. | |

(Continued)

FOREIGN PATENT DOCUMENTS

DE  102009028409 A1  2/2011
DE  102010041885 A1  4/2012

(Continued)

OTHER PUBLICATIONS

The International Search Report and the Written Opinion of the International Searching Authority issued in counterpart application No. PCT/US2015/044802 dated Nov. 9, 2015 (5 pages).

*Primary Examiner* — Fadey Jabr
*Assistant Examiner* — Yazan A Soofi

(57) ABSTRACT

A target steering angle is detected, where the target steering angle is associated with an implement steering system for tracking a planned implement path. A data processor determines whether or not the implement steering angle is at or near a maximum steering angle toward a lateral upslope of ground. The data processor determines whether the implement is aligned with the planned implement path. A controller or data processor adjusts a target vehicle steering angle of the vehicle to guide the implement toward the lateral upslope in alignment with the planned implement path such that the implement tracks the planned implement path if the implement steering angle is at or near the maximum steering angle.

22 Claims, 6 Drawing Sheets

(56) References Cited

U.S. PATENT DOCUMENTS

| | | |
|---|---|---|
| 7,784,558 B2 | 8/2010 | Mozingo |
| 7,904,226 B2 | 3/2011 | Dix |
| 8,112,201 B2 | 2/2012 | Aral |
| 8,131,432 B2 | 3/2012 | Senneff et al. |
| 8,190,364 B2 | 5/2012 | Rekow |
| 8,244,442 B2 | 8/2012 | Craig et al. |
| 8,346,443 B2 | 1/2013 | Senneff et al. |
| 8,359,141 B1 | 1/2013 | Lange |
| 8,565,984 B2 | 10/2013 | Mayfield et al. |
| 8,577,558 B2 | 11/2013 | Mitchell |
| 8,639,416 B2 | 1/2014 | Jones et al. |
| 8,649,930 B2 | 2/2014 | Reeve et al. |
| 2003/0208311 A1 | 11/2003 | McClure |
| 2004/0124605 A1 | 7/2004 | McClure et al. |
| 2006/0282205 A1* | 12/2006 | Lange .................... G01C 21/20 701/50 |
| 2008/0915268 | 8/2008 | Sapilewski et al. |
| 2008/0228353 A1 | 9/2008 | Mayfield et al. |
| 2009/0032273 A1 | 2/2009 | Hahn |
| 2010/0017075 A1 | 1/2010 | Beaujot |
| 2010/0256871 A1 | 10/2010 | Mitchell |
| 2011/0100657 A1 | 5/2011 | Connors et al. |
| 2011/0112721 A1 | 5/2011 | Wang et al. |
| 2012/0185133 A1 | 7/2012 | Prickel |
| 2012/0186421 A1* | 7/2012 | Firth ...................... F41H 11/30 89/1.13 |
| 2012/0232760 A1 | 9/2012 | Hubalek |
| 2012/0240546 A1 | 9/2012 | Kormann |
| 2012/0296529 A1* | 11/2012 | Peake .................. A01B 69/008 701/50 |
| 2013/0046446 A1 | 2/2013 | Anderson |
| 2013/0110358 A1 | 5/2013 | Merx et al. |
| 2013/0186657 A1 | 7/2013 | Kormann et al. |
| 2013/0304300 A1* | 11/2013 | Peake .................. B62D 15/025 701/23 |

FOREIGN PATENT DOCUMENTS

| | | |
|---|---|---|
| EP | 1266553 A2 | 12/2012 |
| WO | 2008005195 A2 | 1/2008 |
| WO | 2012041743 A1 | 4/2012 |

* cited by examiner

SYSTEM AND METHOD FOR STEERING OF AN IMPLEMENT ON SLOPED GROUND

FIELD OF THE INVENTION

This invention relates to a system and method for steering of an implement.

BACKGROUND

An implement may be associated with an active steering system that controls the position of the implement in response to a control signal. However, certain active steering systems fail to track a desired path on a sloped ground or terrain. Accordingly, there is a need for steering of the implement to avoid tracking error that might otherwise occur.

SUMMARY OF THE INVENTION

In accordance with one embodiment, a system and method for steering an implement comprises a steering detector for detecting a target steering angle associated with an implement steering system. A target steering angle is detected, where the target steering angle is associated with an implement steering system for tracking a planned implement path. A data processor determines whether or not the implement steering angle is at or near a maximum steering angle toward a lateral upslope of ground. The data processor determines whether the implement is aligned with the planned implement path (e.g., or is downward on the lateral upslope from the planned implement path). A controller or data processor adjusts a target vehicle steering angle of the vehicle to guide the implement toward the lateral upslope in alignment with the planned implement path such that the implement tracks the planned implement path if the implement steering angle is at or near the maximum steering angle.

DESCRIPTION OF THE PREFERRED EMBODIMENT

Figure 1:
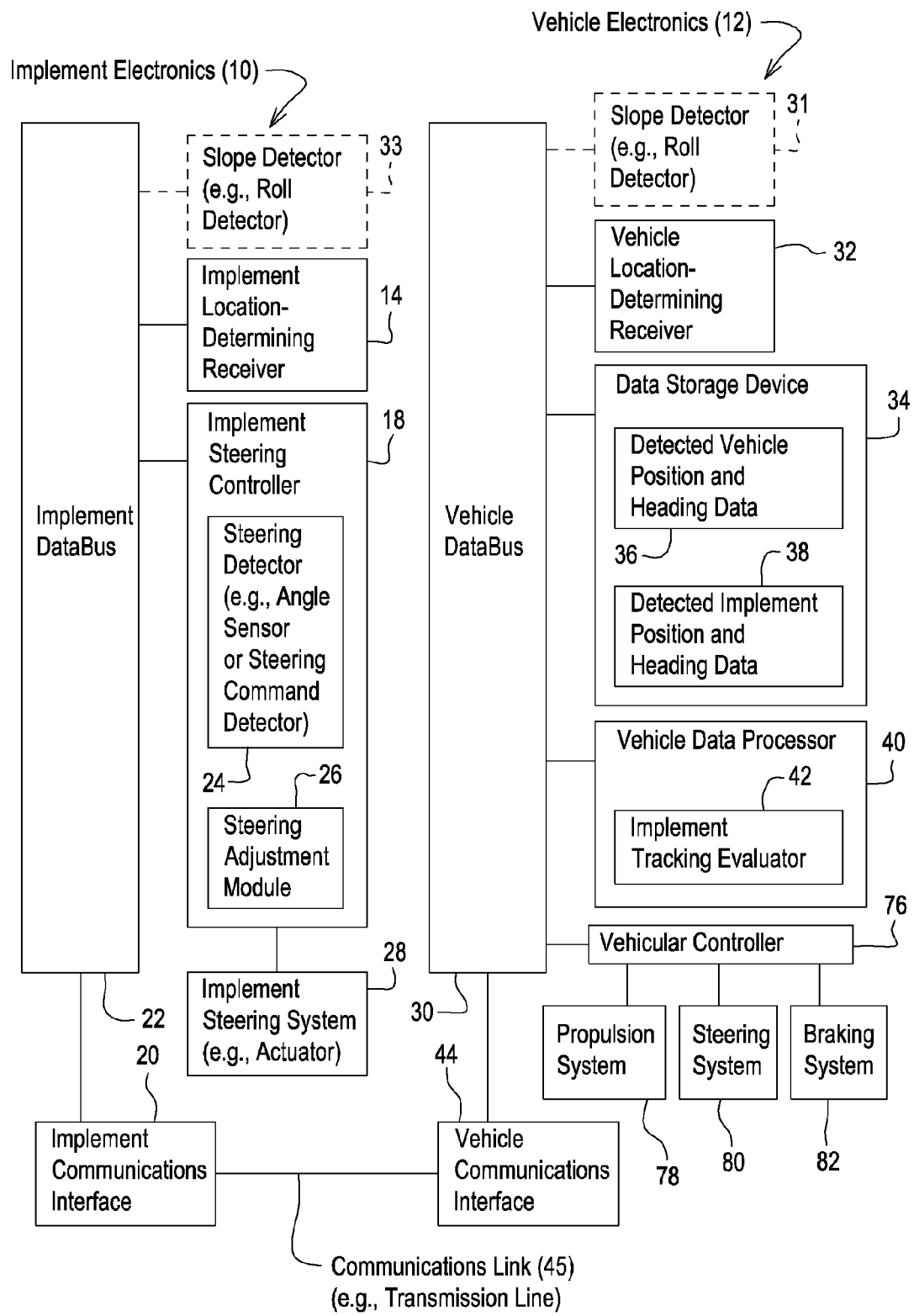
FIG. 1 is a block diagram of one embodiment of a system for variable steering of an implement.

In accordance with one embodiment, the system of FIG. 1 comprises vehicle electronics 12 and implement electronics 10. The vehicle electronics 12 and the implement electronics 10 may communicate with each other via a communications link 45 between a vehicle communications interface 44 and an implement communications interface 20. The communications link 45 may comprise a transmission line, a cable, a wire harness, a paired transmitter and receiver for transmission of electromagnetic signals (e.g., radio frequency, optical or microwave), or a set of wireless transceivers for communication of electromagnetic signals. The vehicle electronics 12 may be carried or mounted on the vehicle (e.g., propulsion unit or vehicle). The implement electronics 10 may be carried on or mounted on the vehicle or the implement.

Figure 2:
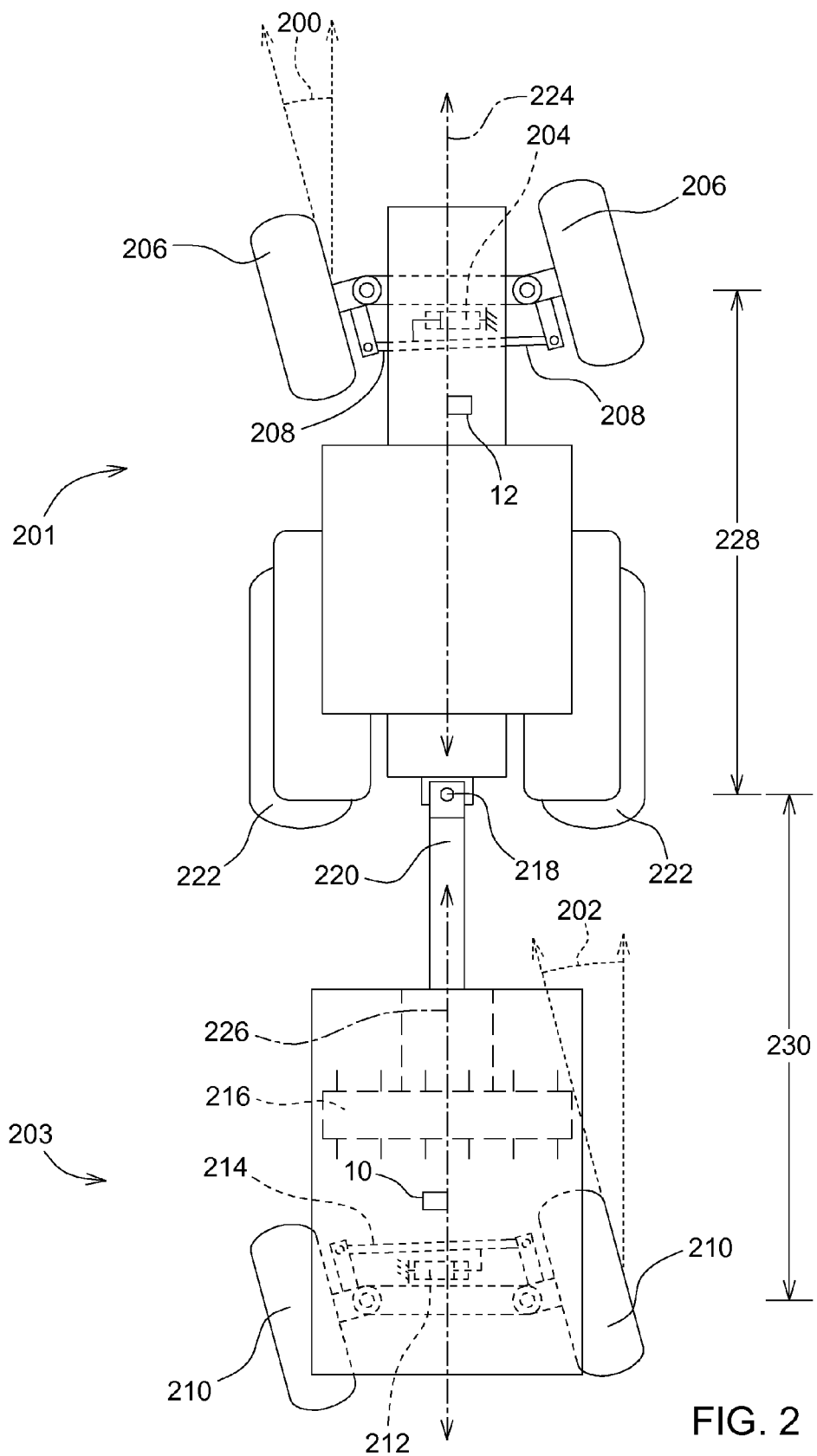
FIG. 2 is a plan view of a steerable vehicle and a steerable implement that incorporates the system of FIG. 1.

The implement may have wheels or tracks that engage the ground. As illustrated in FIG. 2, the implement has at least two steerable wheels, although other configurations of implements can fall within the scope of this disclosure. In certain embodiments, the implement comprises a sprayer for spraying chemicals, solutions, insecticides, herbicides, fungicides, fertilizer, nitrogen, potash, phosphorus, minerals, nutrients, soil treatments, or other crop inputs. In other embodiments, the implement comprises a ground-engaging portion, such as coulters, discs, harrows, tines, knives, cutting tool, a digger, a plate, a planting member, or another device for plowing, planting, cultivating, cutting, or providing an agronomic function.

In one embodiment, the vehicle electronics 12 carried by the vehicle (e.g., a vehicle) comprises a vehicle location-determining receiver 32, a data storage device 34, a vehicle data processor 40, a vehicle controller 76, and a vehicle communications interface 44 coupled to a data vehicle bus. The vehicle data processor 40 may communicate with one or more of the following via the vehicle data bus 30: the vehicle location-determining receiver 32, the data storage device 34, the vehicle communications interface 44, and the vehicle controller 76.

The vehicle location-determining receiver 32 may comprise a global positioning system (GPS) receiver, a GPS receiver with differential correction, or another receiver for receiving location data from satellite or terrestrial reference transmitters. The vehicle location-determining receiver 32 determines a position of the location-determining receiver which is mounted on or carried by the vehicle. The vehicle location determining receiver provides vehicle position data coordinates and heading data 36 for the vehicle. The position data may be expressed in coordinates (e.g., longitude and latitude). The heading may be expressed as an angular bearing with reference to the magnetic or geographic North pole or another reference, for example.

In one embodiment, the vehicle location-determining receiver 32 comprises an inertial measurement unit, a gyroscope, an accelerometer, multi-axis accelerometer, or another sensor for detecting roll, pitch or yaw angles of the vehicle, or the vehicle location-determining receiver 32.

In an alternate embodiment, the vehicle electronics 12 comprises an optional slope detector 31 (e.g., roll detector) for detecting or sensing a slope of the ground or terrain (e.g., that the vehicle traverses). For example, the slope detector may comprise an inertial measurement unit, a gyroscope, an accelerometer, multi-axis accelerometer, or another sensor for detecting roll, pitch or yaw angles of the vehicle, or the vehicle location-determining receiver 32. The slope detector 31 is shown in dashed lines because it is optional and may be deleted or omitted in certain embodiments.

The vehicle data processor 40 comprises a microprocessor, a controller, a microcontroller, a digital logic circuit, a programmable logic array, an application specific integrated circuit (ASIC), or another data processing device. The data processor 40 may further comprise an implement tracking evaluator 42. For example, the implement tracking evaluator 42 may estimate an implement heading, an implement position (e.g., future estimated implement position given a target vehicle steering angle and a target implement steering angle), or both based on a kinematic model. The kinematic model may comprise a bicycle model, or a variant thereof, if the steerable wheels of the implement are in a generally fixed neutral or generally straight heading. Other kinematic models can be applied to the articulated assembly of the vehicle and the implement, where the front wheels of the vehicle and the rear-most wheels of the implement are steerable. The kinematic model may use one or more of the following inputs to estimate the implement heading or implement position (e.g., future estimated implement position): vehicle position; vehicle heading; a distance between the hitch point and front implement wheels; location of the pivot point with respect to the vehicle or the implement, or the steerable wheels of the vehicle or implement; the wheelbase or width of the implement wheels, among other factors. The implement tracking evaluator 42 may comprise software modules, electronic modules, or any combination of the foregoing.

The data storage device 34 may comprise electronic memory, a magnetic storage device, an optical storage device, a hard disk, non-volatile random access memory, computer memory, or another device for storing data (e.g., digital data). The data storage device 34 stores one or more of the following: detected vehicle position and heading data 36 (e.g., provided by the vehicle location determining receiver 32), detected implement position and heading data (e.g., provided by the implement location-determining receiver 14), and detected roll angle data for the vehicle, implement or both, or detected roll angle data, pitch angle data, and yaw angle data for the vehicle, implement or both. The data storage device 34 may store, retrieve or access one or more of the following types of data: detected vehicle position and heading data 36 and implement position and heading data.

The vehicle communications interface 44 may comprise an input/output data port, a communications port, a transmitter, a receiver, a wireline transceiver, or a wireless transceiver. In one embodiment, the vehicle communications interface 44 may comprise buffer memory for storing data that is received from the vehicle data bus 30 or another data source, transmitted to the vehicle data bus 30, or to another data recipient. The input/output data port may comprise a transceiver, such as a universal asynchronous receiver/transmitter.

In an alternate embodiment, the implement electronics 10 comprises an optional slope detector 33 (e.g., roll detector) for detecting or sensing a slope of the ground or terrain (e.g., that the vehicle traverses). For example, the slope detector may comprise an inertial measurement unit, a gyroscope, an accelerometer, multi-axis accelerometer, or another sensor for detecting roll, pitch or yaw angles of the vehicle, or the implement location-determining receiver 14. The slope detector 31 is shown in dashed lines because it is optional and may be deleted or omitted in certain embodiments.

The vehicular controller 76 may comprise a controller for controlling and interfacing with the steering system 80, the propulsion system 78, and the braking system of the vehicle. The controller 76 may convert or issue steering commands (e.g., steering angle commands) or signals, braking commands or signals, throttle commands to an engine, or control signals to an electric motor from signals responsive to or generated by the vehicle data processor 40.

The implement electronics 10 comprises an implement location-determining receiver 14, an implement steering controller 18 and an implement communications interface 20 coupled to an implement data bus 22. In turn, the implement steering controller 18 is coupled to an implement steering system 28.

The implement steering controller 18 may communicate with one or more of the following components via the implement data bus 22: the implement location determining receiver 14, the implement mode detector 16, the implement steering controller 18, and the implement communications interface 20.

The implement steering controller 18 may receive implement steering data based on one or more of the following: a difference between implement position data and vehicle position data, and a difference between implement heading data and vehicle heading data, a planned path of the vehicle, and planned path of the implement. In response to the received implement steering data, the implement steering controller 18 may generate control data for the implement steering system 28 to control the implement steering system 28 in accordance with the implement steering data and the planned path of the implement.

The implement steering controller 18 compromises a steering detector 24 and a steering adjustment module 26. In one embodiment, steering detector 24 may comprise an implement wheel angle sensor that detects the angle of a steered wheel of the implement, a steerable hitch, a steerable tongue associated with a hitch assembly, a steerable coulter, or otherwise. In another embodiment, the steering detector 24 receives, intercepts or reads a steering command data from the steering adjustment module 26, or from the vehicle controller 76, or from the steering system 80 of the vehicle, or from any combination of the foregoing devices.

In an alternate embodiment, a vehicle steering detector may be associated with the vehicle to detect the vehicle steering angle of one or more steerable wheels on the vehicle.

The steering adjustment module 26 or implement controller 18 may steer the implement via the implement steering system 28. The implement steering system 28 may comprise an electrically controlled steering system, an electro-hydraulic steering system, a solenoid controlled steering system, or another system for changing the direction of one or more wheels or ground-engaging members (e.g., coulters) of the implement. In an alternative embodiment, the steering system may comprise a skid steering system in which differential rotation rates are applied by the propulsion system to different wheels to steer the vehicle.

In yet an alternate embodiment, the implement steering system 28 may comprise an electrically controlled steering system, an electro-hydraulic steering system, or solenoid controlled steering system associated with a steerable hitch, a steerable tongue of an implement hitch, or a steerable members of a towing vehicle attachment points, where the implement steering system 28 is located on the vehicle that tows or provides propulsion for the implement. Accordingly, the implement steering system 28 may be associated with the wheels or ground-engaging coulter of the implement may be located on the vehicle or vehicle towing or providing propulsion for the implement.

The actuator of the implement steering system 28 may comprise a hydraulic actuator, an electrical actuator, a linear motor, an electric motor, an electro-hydraulic actuator, a solenoid, a servo-motor, or the like. The actuator imparts force or movement or rotation of one or more wheels of the implement to steer the implement in accordance with command data from the implement steering controller 18.

The implement steering controller 18 may generate a control signal or control data for application to or use by the implement steering system 28. The implement steering controller 18 comprises a device for generating a logic level signal, an analog or digital signal representative of a desired or target steering angle of the steering system (e.g., implement steering system 28), a variable voltage signal, a variable current signal, or any data processing device for controlling the implement steering system 28.

The vehicle controller 76 is capable of communicating via the vehicle data bus 30. The vehicle controller 76 is coupled, directly or indirectly, to the steering system 80. The vehicle controller 76 is capable of generating control signals or control data to control the propulsion system 78, the steering system 80 and the braking system 82 of the vehicle. The vehicle controller 76 may further comprise a logic circuit, a data processing system or another device for generating an analog or digital control signal for the steering system and braking system.

In one illustrative embodiment, the implement electronics 10 and vehicle electronics 12 may function as follows. In the vehicle electronics 12, the vehicle data processor 40 may establish a desired or target path of the implement, a target path of the vehicle, or both. The implement target path may be based on a starting point and a termination point that define a linear segment or a series of interconnected points that form a contour or jagged line. Each point may be define by its coordinates (e.g., longitude and latitude) and stored in the data storage device 34. In the implement electronics 10, the implement steering controller 34 attempts to track the implement target path to prevent the implement from slipping downward on a lateral slope with respect to the direction of travel of the vehicle and implement, for example. However, once the maximum implement steering angle is reached, the data processor 40 decides whether or not to adjust the vehicle steering angle to track the implement target path based on the deviation from the implement path, the slope angle or degree of the lateral slope, or both. At the vehicle electronics 12, the implement tracking evaluator 42 may receive a detected implement position and heading data 38 from the implement location determining receiver 14 or another implement position determining device via the implement communications interface 20, the vehicle communications interface 44, and communications link 45. Accordingly, the implement target steering angles, the vehicle target steering angles, or both are managed or controlled by the implement electronics 10 and the vehicle electronics 12, consistent with the commands, data and signals generated by the vehicle data processor 40 and/or the vehicle controller 76.

As used in this document, the terms adapted to, configured to, or arranged to mean that any data processor (40), controller (18, 76), or other electronic module or combination of such electronic modules is programmed with software instructions (e.g., executable code and libraries) or configured with equivalent hardware components, logic or hardware to achieve one or more referenced functions or features. Such referenced features are described with the benefit and detail of various hardware, structural details, data, block diagrams, and flow charts described in this document.

FIG. 2 is an illustrative plan view of a vehicle 201 and an implement 203, where the vehicle 201 is associated with vehicle electronics 12 and where the implement 203 is associated with implement electronics 10. In at least one embodiment, the vehicle steering system 80 of FIG. 1 comprises the vehicle actuator 204 (e.g., vehicle steering actuator) and the vehicle steering linkage 208 of FIG. 2; the implement steering system 28 of FIG. 1 comprises the implement actuator 212 (e.g., implement steering actuator) and the implement steering linkage 214 of FIG. 2. Accordingly, in certain embodiments the block representing the vehicle electronics 10 can incorporate or encompass the vehicle actuator 204 and the vehicle steering linkage 208, and the block representing implement electronics 12 can incorporate or encompass the implement actuator 212 and the implement steering linkage 214.

The vehicle 201 (e.g. vehicle) has a set of steerable vehicle wheels 206 (e.g., front wheels). As shown, a vehicle actuator 204 (e.g., electrohydraulic member or vehicle steering actuator) can steer or adjust the target vehicle steering angle 200 of steerable vehicle wheels 206 via a vehicle steering linkage 208 or another mechanical assembly. Although the vehicle 201 illustrates that the steerable vehicle wheels 206 are front wheels, in alternate embodiment the steerable vehicle wheels may comprise other steerable wheels or steerable rear wheels. Further, other configurations are possible such as a single steerable front wheel, or rear tracks, instead of rear wheels 222.

As shown in FIG. 2, an implement actuator 212 (e.g., electrohydraulic member) can steer or adjust the target implement steering angle 202 of implement steerable wheels 210 via implement steering linkage 214 or another mechanical assembly. In one embodiment, for example, the maximum implement angle (e.g., limit or maximum adjustment range) of the implement steering angle 202 depends upon the configuration and geometry of the implement steering linkage 214 and the implement actuator 212, or upon the physical limitations of the implement steering system 28.

The vehicle 201 and implement 203 are connected at a pivot point 218 via a hitch 220. The direction of travel of the vehicle can be defined with reference to the vehicle longitudinal axis 224 of the vehicle 201, whereas the direction of travel of the implement can be defined with reference to the implement longitudinal axis 226 of the implement. A first distance 228 is defined between the pivot point 218 and an axis of rotation of the steerable vehicle wheels 206 of the vehicle 201. A second distance 230 is defined between a pivot point 218 and an axis of rotation of steerable implement steerable wheels 210 of the implement 203.

Optionally, depending upon the particular configuration of the implement, the implement may have optional crop processing machinery, ground engaging machinery, or other structural components 216 for agricultural, construction, forestry, industrial or other work tasks.

Figure 3A:
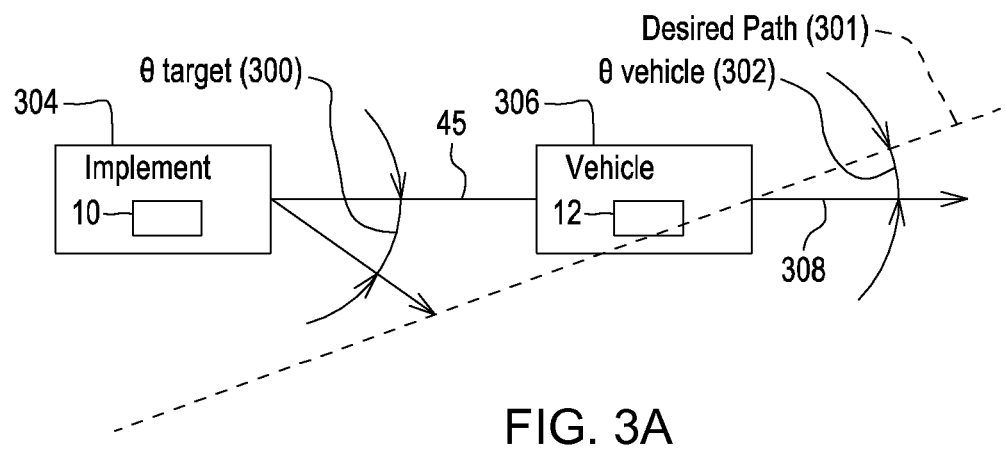
FIG. 3A and FIG. 3B are plan-view diagrams that indicate illustrative paths of an implement.

FIG. 3A shows a vehicle that is towing an implement. The vehicle 306 is equipped with the vehicle electronics 12, such as that shown in FIG. 1. The implement 304 is equipped with the implement electronics 10, such as that shown in FIG. 1. The vehicle 306 of FIG. 3A and FIG. 3B may represent the vehicle 201 of FIG. 2 or any other vehicle that is suitable for the method and system of this disclosure. Similarly, the implement 304 of FIG. 3A and FIG. 3B may represent the implement 203 of FIG. 2 or any other steerable implement that is suitable for the method and system of this disclosure, regardless of the number of wheels of the implement, which wheels are steerable, and which wheels are fixed or non-steerable.

Figure 3B:
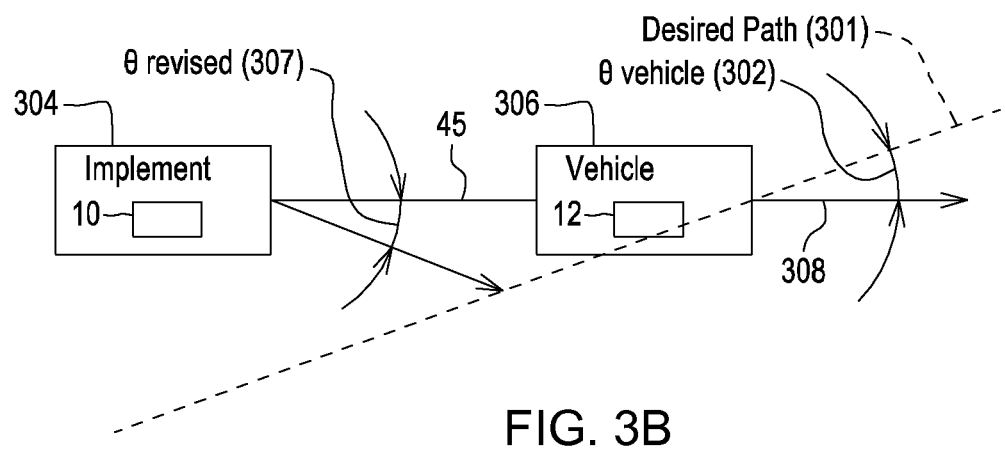

The vehicle target steering angle 302 of the vehicle is indicated as $\theta_{vehicle}$ in FIG. 3A and in FIG. 3B. The vehicle target steering angle 302 ($\theta_{vehicle}$) is measured with reference to the vehicle heading 308. The vehicle target steering angle 302 refers to the difference between the vehicle heading 308 and the desired path 301 (e.g., of the vehicle and the implement) which is shown as a dashed line.

In FIG. 3A, the target steering angle 300 of the implement is indicated as $\theta_{target}$. The target steering angle 300 is measured with reference to the vehicle heading 308. The target steering angle 300 is selected to bring the implement path in alignment with the desired path 301 such that both the vehicle and implement follow approximately the same desired path, with a time lag in the implement following the desired path 301.

In FIG. 3A and FIG. 3B, the vehicle target steering angle 302 ($\theta_{target}$) of the vehicle is the same. The target steering angle 300 ($\theta_{target}$) of FIG. 3A is greater than the revised steering angle 307 of FIG. 3B. The target steering angle 300 of FIG. 3A would theoretically bring the implement in more rapid alignment with the desired path than the revised steering angle 307 of FIG. 3B does.

Figure 4:
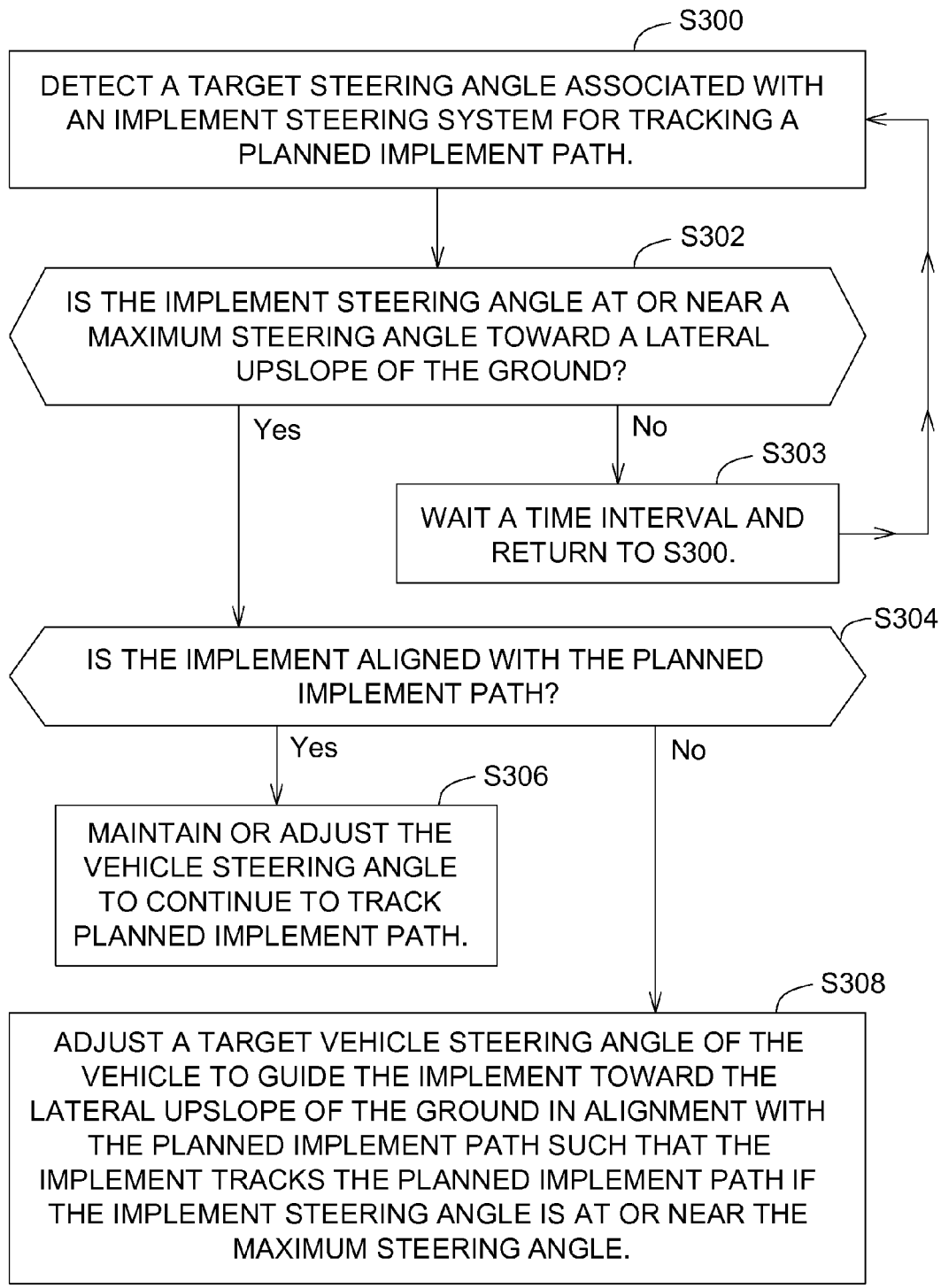
FIG. 4 is a flow chart of one example of a method for steering an implement on sloped ground.

FIG. 4 is one example of a method for steering of an implement on sloped ground. The method of FIG. 2 begins in step S300.

In step S300, a steering detector 24 detects a target steering angle (202) associated with an implement steering system 28 or the implement actuator 212. The steering detector 24 may detect the target steering angle (202), where the steering command comprises a target steering angle. In one configuration, the steering angle may be detected via an angular sensor (e.g., magnetic field sensor and a magnet mounted on the steerable wheel (210) or implement linkage 212, a potentiometer, differential evaluation of accelerometers) associated with a steerable wheel (210) or implement linkage 212 of the implement. In another configuration, the steering detector 24 may read, intercept or receive a steering command sent by the vehicle data processor 40 to monitor the current or future target steering angle. In yet another configuration, the steering command, or a derivative thereof, is observed as communicated between the steering adjustment module 26 (or the implement steering controller 18) and the implement steering system 28.

In step S302, a data processor 40 or implement steering controller 18 determines whether or not the implement steering angle (202) is at or near a maximum implement steering angle toward a lateral upslope of the ground. The maximum implement steering angle may be defined as a factory setting that is based on the limits of movement of the implement actuator (212), implement steering system 28, or any associated implement steering linkage (214). In an alternate embodiment, the maximum implement steering angle (202) may represent a field programmable setting for a particular implement based on implement's purpose, weight, weight distribution, center of gravity, dimensions, wheelbase, width, suspension, wheel geometry or other factors. If the implement steering angle (202) is at a or near the maximum steering angle, then the method continues with step S304. However, if the implement steering angle (202) is not at or near the maximum steering angle, then the method continues with step S303.

In step S303, the data processor, the implement steering controller or both wait a time interval and return to step S300.

In step S304, the data processor 40, the implement steering controller 18, or both determine whether the implement (203, 304) is aligned with the planned implement path (301) (e.g., within a certain tolerance or acceptable error range). For example, the implement steering controller 18, the data processor 40, or both are adapted determine whether the implement (203, 304) is downward on the lateral upslope from the planned implement path (301) based on location data (and slope data of the implement or ground) from the implement location-determining receiver 14, or based on location data (and slope data of the vehicle or ground) from the vehicle location-determining receiver 32 in conjunction with the kinematic model of implement movement and position (e.g., executable by the vehicle data processor or its implement tracking evaluator 42). The data storage device 34 may store the planned implement path (301) as a set of points (e.g., two or three dimensional coordinates) or linear, or quadratic equations, or otherwise that the data processor 40 can compare to the location of the location-determining receiver (14, 32). If the implement (203, 304) is aligned with the planned implement path (301), then the method continues with step S306. However, if the implement (203, 304) is not aligned with the planned implement path (301), then the method continues with step S308.

In step S306, the data processor 40 or vehicle controller 76 maintains or adjusts the vehicle steering angle to continue to track planned implement path (e.g., without any additional compensation to account for downward slippage or deviation of the implement from the planned implement path 301 that is generally or predominately attributable to the slope of the ground).

In step S308, the data processor 40, the vehicular controller 76, or the implement steering controller 18, or any combination of the foregoing control modules (40, 76, 18) adjusts a target vehicle steering angle (200) of the steerable vehicle wheels 206 of the vehicle (201, 306) to guide the implement (203, 304) toward the lateral upslope of the ground in alignment with the planned implement path (301) if the implement steering angle (202) is at or near the maximum steering angle. Here, the data processor 40, the vehicular controller 76, or the implement steering controller 18, or any combination of the foregoing control modules (40, 76, 18) selects the target vehicle steering angel (200) by the steering system 80 or vehicle actuator 204 to provide any additional compensation to account for downward slippage or deviation of the implement from the planned implement path 301 that is generally or predominately attributable to the slope of the ground.

Step S308 may be carried out in accordance with various techniques that may be applied separately or cumulatively. Under a first technique, the data processor 40, the implement steering controller 18, or both determine or calculate the target implement steering angle for the implement steering system and the target vehicle steering angle for the vehicle steering system, collectively, if the implement steering angle is at or near a maximum angle. For example, the data processor 40, the implement steering controller 18, or both determine the target implement steering angle and the target vehicle steering angle based on one or more of the following parameters: implement wheel steering (angle) data, vehicle wheel steering (angle) data, vehicle position data, implement position data, implement heading data, the vehicle heading data, and kinematic model data.

Under a second technique for executing step S308, the vehicle data processor 40 or the vehicle controller 76 determines the target vehicle steering angle based at least partially on a kinematic model (e.g., bicycle model) of the vehicle and implement to estimate a future position (and current heading or yaw) of the implement that is aligned with or consistent with the planned implement path.

Under a third technique, the data processor 40 or the vehicular controller 76 adjusts the target vehicle steering angle to guide the implement toward the lateral upslope in alignment with the planned implement path such that the implement tracks the planned implement path if the implement steering angle is at or near the maximum steering angle (as measured by the steering detector 24) and if the implement is downward on the lateral slope from the planned implement path. For example, the data processor 40 determines whether the implement is downward on the lateral slope, which is generally perpendicular to the longitudinal axis (224, 226) or direction of travel of the vehicle or implement, based on the implement position and/or heading with respect to the planned implement path, along with the corresponding lateral slope or roll of the vehicle or implement at or near the implement position. The data processor 40 or implement steering controller 18 can determine whether the implement (203, 304) is aligned with the planned implement path (301) by evaluating location data from a location-determining receiver (14, 32) with respect to a planned implement path (301), whether the implement (203, 304) is downward on the lateral upslope from the planned implement path (301). The planned implement plan 301 may be represented by two or more points (e.g., two or three dimensional coordinates or way points) that define a linear segment or a curved segment.

Under a fourth technique, the data processor 40 or the vehicle controller 76 adjusts the target vehicle steering angle such that the target vehicle steering angle is reduced by limiting the target steering angle consistent with a maximum rate of angular change per unit time.

Under a fifth technique, the data processor 40 or the vehicle controller 76 applies the target vehicle steering angle to an actuator or steering system 80 for controlling an angular heading or yaw angle of one or more steerable wheels of the vehicle.

Figure 5:
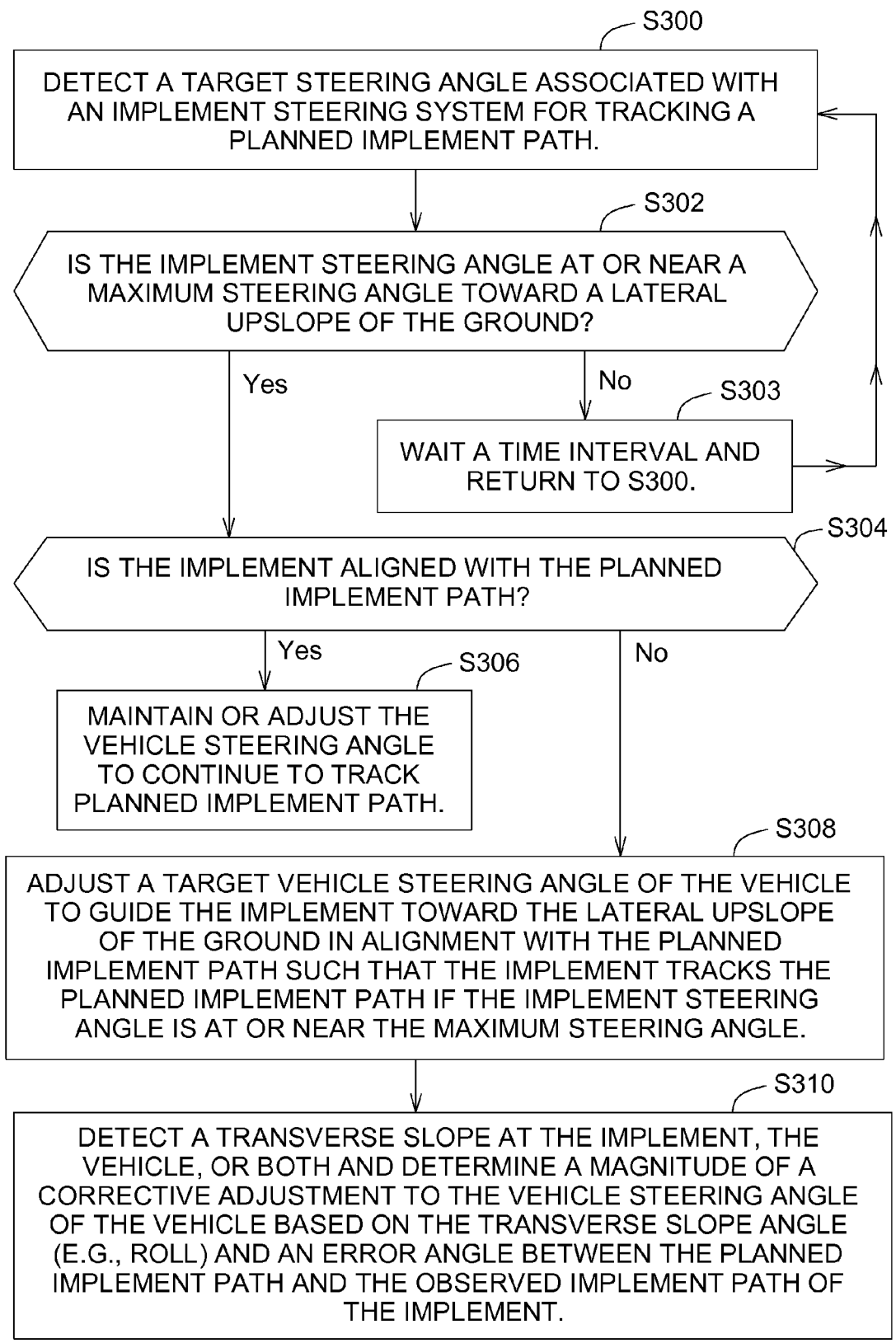
FIG. 5 is a flow chart of another example of a method for variably steering an implement on sloped ground.

The method of FIG. 5 is similar to the method of FIG. 4, except the method of FIG. 5 further includes step S310. Like reference numbers in FIG. 4 and FIG. 5 indicate like steps, procedures or features.

In step S310, the slope detector (31, 33) or the location-determining receiver (14, 32) detects or estimates a transverse slope (of the ground or the corresponding roll angle of the implement) at the implement, the vehicle, or both and the data processor 40 or vehicular controller 76 determines a magnitude of a corrective adjustment to the vehicle steering angle of the vehicle based on the traverse slope angle (e.g., roll angle of the implement) and an error angle (300) between the planned implement path (301) and the observed implement path (308) of the implement.

Figure 6:
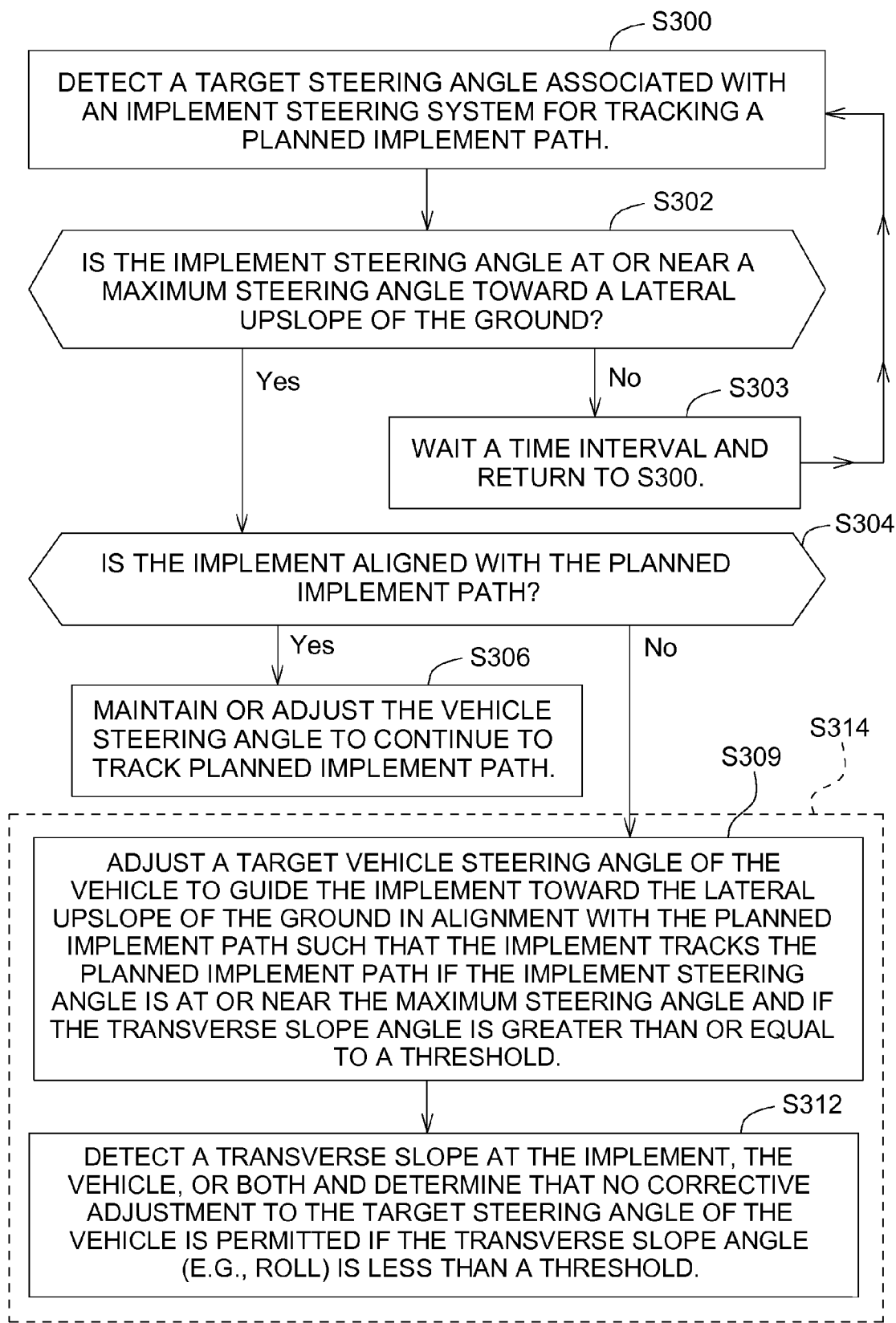
FIG. 6 is a flow chart of yet another example of a method for variably steering an implement on sloped ground.

The method of FIG. 6 is similar to the method of FIG. 4, except the method of FIG. 5 replaces step S308 with step S314. Like reference numbers in FIG. 4 and FIG. 6 indicate like steps, procedures or features.

Step S314 comprises step S309, step S312, or both steps S309 and S312. Step S309 and step 312 may be executed in any order. If the method of FIG. 6 has multiple iterations, the iterations may differ as to whether step S309 or step S312 is executed depending upon the transverse slope angle, or corresponding implement roll angle, measured or observed with respect to the threshold (e.g., grade or slope angle of approximately five (5) percent). The transverse slope angle of the ground is measured with respect to level or flat ground surface, such as a plane that is generally perpendicular to the Earth's surface. The roll angle (of the vehicle or implement) that corresponds to the transverse slope of the ground may be measured with respect to a normal (line segment) that is generally perpendicular to the Earth's surface (e.g., where the roll angle and transverse slope are complementary or have a sum angle equal to approximately 90 degrees), or with respect to the level or flat ground surface. In alternate embodiments, the vehicle roll angle, the implement roll angle, or both may be used to estimate the transverse slope angle of the ground for a corresponding location on a field or work site.

In step S309, the data processor 40 or implement steering controller 18 adjusts a target vehicle steering angle (200) of the vehicle (201, 306) to guide the implement (203, 304) toward the lateral upslope of the ground in alignment with the planned implement path (301) if the implement steering angle is at or near the maximum steering angle and if the transverse slope angle is greater than or equal to a threshold (e.g., grade or slope angle of approximately five (5) percent). The slope detector (31, 33) or the location-determining receiver (14, 32) detects a transverse slope at the implement, the vehicle, or both and may use any set, combination or permutation of measurements to estimate the transverse slope of the ground at a corresponding location of a field or work site.

In step S312, the slope detector (31, 33) or the location-determining receiver (14, 32) detects a transverse slope at the implement, the vehicle, or both and the data processor 40 or vehicular controller 76 determines that no corrective adjustment to the vehicle steering angle of the vehicle is permitted if the transverse slope angle (e.g., roll) is less than a threshold (e.g., grade or slope angle of approximately five (5) percent). Accordingly, the implement steering system 28 and implement steering controller 18 may compensate effectively for a transverse slope angle that is less than the threshold, but the threshold can be adjusted dynamically for factors such as tire size, tire profile, vehicle weight, implement weight, implement wheelbase dimensions, vehicle wheelbase dimensions, soil moisture content, historic rainfall, soil or ambient temperature, soil constituents (e.g., clay, sand, loam, and organic matter components), or the like.

The method and system is well suited for ameliorating the potential tracking errors in the implement path that might otherwise occur for lateral slopes, such as extreme side slopes (e.g., greater than five (5) degrees grade) of the ground in certain fields or work sites. For example, if the lateral slopes exceed a critical angle or slope, actively steering the implement may not provide enough steering force to keep the implement on the target steering line or planned implement path. However, the vehicle (e.g., tractor) can provide additional lateral steering effort to the implement by steering the vehicle (tractor) to an uphill steering angle offset to the target steering line or planned implement path. Accordingly, the implement can stay aligned with the target steering line or planned path to produce uniform and targeted spacing between adjacent rows of plants, or to track existing rows during spraying operations, or to track rows for land-leveling or grading operations.

The vehicle data processor 40 may support or allow one or more of the following operational modes: (1) an active implement guidance mode, (2) a passive implement guidance mode, and (3) a hybrid implement guidance mode. In an active implement guidance mode the implement steering system 28, as directed by the implement steering controller 18, steers the implement steerable wheels 210 to guide the implement 203. In contrast, in a passive implement guidance mode the implement steering controller 18 and implement steering system 28 may lock the implement steerable wheels 210 in a neutral stance or straight path (e.g., approximately zero implement steering angle 202 as the target implement steering angle) such that the implement 203 relies (e.g., predominately or entirely) upon the steering system 80 of the vehicle 201 or tractor to steer the steerable vehicle wheels 206, which in turn steer the implement in accordance with a target steering line or planned path. Here, the active implement guidance mode is combined with the passive implement guidance mode to form a hybrid mode for keeping the implement aligned with a planned implement path on steeper lateral slopes with respect to the longitudinal axis 226 of the implement 203.

In the active implement guidance mode, the implement steering controller 18 commands the implement steering system 28 on the implement until that steering element reaches the actuator travel limit of the implement actuator 212, which is associated with the maximum implement angle for the implement steering angle 202. Once the maximum implement angle is reached, the vehicle (e.g., tractor) can activate the active guidance mode in which the data processor 40 and vehicle controller 76 provides additional steering off its guidance line to compensate for any downward drift of the implement 203 from its planned implement path. This additional steering force of the vehicle 201 will force the implement 203

The following is claimed:

1. A method for steering an implement, the method comprising:
   detecting a target steering angle associated with an implement steering system of the implement for tracking a planned implement path;
   determining whether or not the implement steering angle is at or near a maximum steering angle toward a lateral upslope of ground;
   determining whether the implement is aligned with the planned implement path; and
   adjusting a target vehicle steering angle of the vehicle to guide the implement toward the lateral upslope in alignment with the planned implement path such that the implement tracks the planned implement path if the implement steering angle is at or near the maximum steering angle.

2. The method according to claim 1 wherein the determining whether the implement is aligned comprises determining, by evaluating location data from a location-determining receiver with respect to a planned implement path, whether the implement is downward on the lateral upslope from the planned implement path.

3. The method according to claim 1 wherein the target vehicle steering angle is adjusted to guide the implement toward the lateral upslope in alignment with the planned implement path such that the implement tracks the planned implement path if the implement steering angle is at or near the maximum steering angle and if the implement is downward on the lateral slope from the planned implement path.

4. The method according to claim 1 further comprising:
   detecting a transverse slope at the implement, the vehicle, or both and determining a magnitude of a corrective adjustment to the vehicle steering angle of the vehicle based on the transverse slope angle and an error angle between the planned implement path and the observed implement path of the implement.

5. The method according to claim 1 wherein the adjusting comprises adjusting a target vehicle steering angle of the vehicle to guide the implement toward the lateral upslope in alignment with the planned implement path such that the implement tracks the planned implement path if the implement steering angle is at or near the maximum steering angle and if the transverse slope angle is greater than or equal to a threshold.

6. The method according to claim 5 further comprising:
   detecting a transverse slope at the implement, the vehicle, or both and determining that no corrective adjustment to the target steering angle of the vehicle is permitted if the transverse slope angle is less than the threshold.

7. The method according to claim 1 wherein the adjusting further comprises adjusting the target steering angle such that the vehicle target steering angle is reduced by limiting the target steering angle consistent with a maximum rate of angular change per unit time.

8. The method according to claim 1 further comprising:
   applying the target vehicle steering angle to an actuator for controlling an angular heading or yaw angle of one or more wheels of the vehicle.

9. The method according to claim 1 further comprising:
   collecting implement position data and implement heading data for an implement via an implement location-determining receiver;
   collecting vehicle position data and vehicle heading data for a vehicle via a vehicle location-determining receiver; and
   determining implement steering data between the implement position data, the vehicle position data, the implement heading data and the vehicle heading data, calculating the target implement steering angle for the implement steering system and the vehicle steering system collectively based on the implement steering data if the implement steering angle is at or near a maximum angle.

10. The method according to claim 1 wherein the target vehicle steering angle is based at least partially on a kinematic model of the vehicle and implement.

11. A system for steering an implement, the system comprising:
    a steering detector for detecting an implement steering angle associated with an implement steering system of the implement for tracking a planned path;
    an implement location-determining receiver for determining an implement position;
    an implement steering controller for determining whether or not the implement steering angle is at or near a maximum steering angle or a maximum steering angle toward a lateral upslope of ground;
    the implement steering controller or a data processor adapted to determine whether the implement is aligned with the planned implement path; and
    a vehicle controller for adjusting a target vehicle steering angle of the vehicle to guide the implement toward the lateral upslope in alignment with the planned implement path such that the implement tracks the planned implement path if the implement steering angle is at or near the maximum steering angle.

12. The system according to claim 11 wherein the implement steering controller or the data processor is adapted determine whether the implement is downward on the lateral upslope from the planned implement path based on location data from the implement location-determining receiver.

13. The system according to claim 11 wherein the data processor or the vehicular control is arranged to adjust the target vehicle steering angle to guide the implement toward the lateral upslope in alignment with the planned implement path such that the implement tracks the planned implement path if the implement steering angle is at or near the maximum steering angle and if the implement is downward on the lateral slope from the planned implement path.

14. The system according to claim 11 further comprising:
    a slope detector for detecting a transverse slope at the implement, the vehicle, or both;
    the data processor adapted to determine a magnitude of a corrective adjustment to the vehicle steering angle of the vehicle based on the transverse slope angle and an error angle between the planned implement path and the observed implement path of the implement.

15. The system according to claim 11 further comprising:
    a slope detector for detecting a transverse slope at the implement, the vehicle, or both; wherein the data processor is adapted to determine that no corrective adjustment to the target steering angle of the vehicle is permitted if the transverse slope angle is less than a threshold.

16. The system according to claim 11 further comprising:
an implement location-determining receiver for detecting a transverse slope at the implement, the vehicle, or both; wherein the data processor adapted to determine a magnitude of a corrective adjustment to the vehicle steering angle of the vehicle based on the transverse slope angle and an error angle between the planned implement path and the observed implement path of the implement.

17. The system according to claim 11 further comprising:
an implement location-determining receiver for detecting a transverse slope at the implement, the vehicle, or both; wherein the data processor is adapted to determine that no corrective adjustment to the target steering angle of the vehicle is permitted if the transverse slope angle is less than a threshold.

18. The system according to claim 11 wherein the vehicular controller is adapted to adjust the target steering angle such that the vehicle target steering angle is reduced by limiting the target steering angle consistent with a maximum rate of angular change per unit time.

19. The system according to claim 11 wherein the vehicular controller is adapted to apply the target vehicle steering angle to an actuator for controlling an angular heading or yaw angle of one or more wheels of the vehicle.

20. The system according to claim 11 further comprising:
an implement location-determining receiver for collecting implement position data and implement heading data for an implement;
a vehicle location-determining receiver for collecting vehicle position data and vehicle heading data for a vehicle;
a vehicle controller and implement steering controller for determining the target implement steering angle for the implement steering system and the vehicle steering system, collectively, based on implement steering angle data if the implement steering angle is at or near a maximum angle.

21. The system according to claim 11 wherein the target vehicle steering angle is based at least partially on a kinematic model of the vehicle and implement.

22. The system according to claim 11 wherein the vehicle controller is adapted to adjust a target vehicle steering angle of the vehicle to guide the implement toward the lateral upslope in alignment with the planned implement path such that the implement tracks the planned implement path if the implement steering angle is at or near the maximum steering angle and if the transverse slope angle is greater than or equal to a threshold.

* * * * *